May 21, 1963  L. J. HERBON  3,090,291
AIR CONDITIONING APPARATUS FOR AUTOMOTIVE VEHICLE
Filed Aug. 10, 1960  2 Sheets-Sheet 1
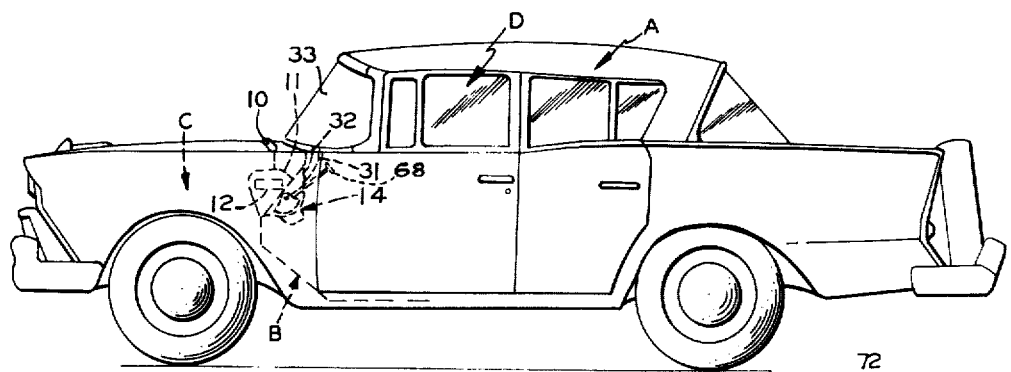
FIG. 1
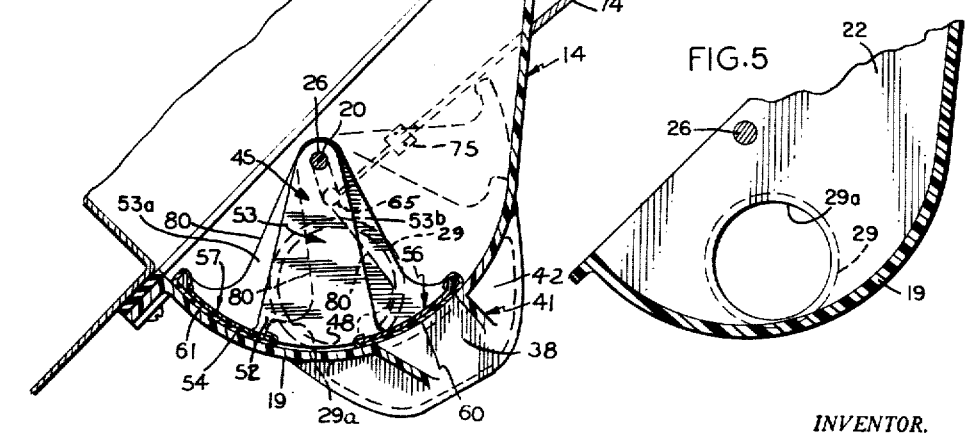
FIG. 6
FIG. 5
FIG. 2
INVENTOR.
LEROY J. HERBON
BY
ATTORNEY INVENTOR.
LEROY J. HERBON
BY
Carl J. Barbee
ATTORNEY United States Patent Office 3,090,291
Patented May 21, 1963

3,090,291
AIR CONDITIONING APPARATUS FOR
AUTOMOTIVE VEHICLE
Leroy J. Herbon, Detroit, Mich., assignor to American
Motors Corporation, Kenosha, Wis., a corporation of
Maryland
Filed Aug. 10, 1960, Ser. No. 48,724
4 Claims. (Cl. 98—2)

The invention relates to an air-conditioning system for an automotive vehicle and has particular reference to such a system employing novel air distribution apparatus.

The principal object of the invention is to provide an air-conditioning system for an automotive vehicle having novel air distribution means.

A specific object of the invention is to provide in an air-conditioning system means for selectively delivering air in one or more of several locations within the passenger compartment of the vehicle.

A further object is to provide a swinging damper valve mounted in a suitable housing having multiple air discharge openings selectively controlled by such valve.

Other objects and advantages of the invention will be apparent from the ensuing specification and appended drawings, in which:

FIG. 1 is a side elevational view of an automotive vehicle employing the air-conditioning system.

FIG. 2 is a fragmentary sectional view of a portion of the air-conditioning system and taken generally on the line 2—2 of FIG. 4 but rotated clockwise approximately 90° with reference to the showing of FIG. 4.

FIG. 5 is a fragmentary sectional detail view taken on line 5—5 of FIG. 4 but rotated clockwise approximately 90° with reference to the showing of FIG. 4.

FIG. 6 is an end view of the damper valve taken generally on the line 6—6 of FIG. 4 but rotated counterclockwise approximately 90° with reference to the showing of FIG. 4.

Figure 3:
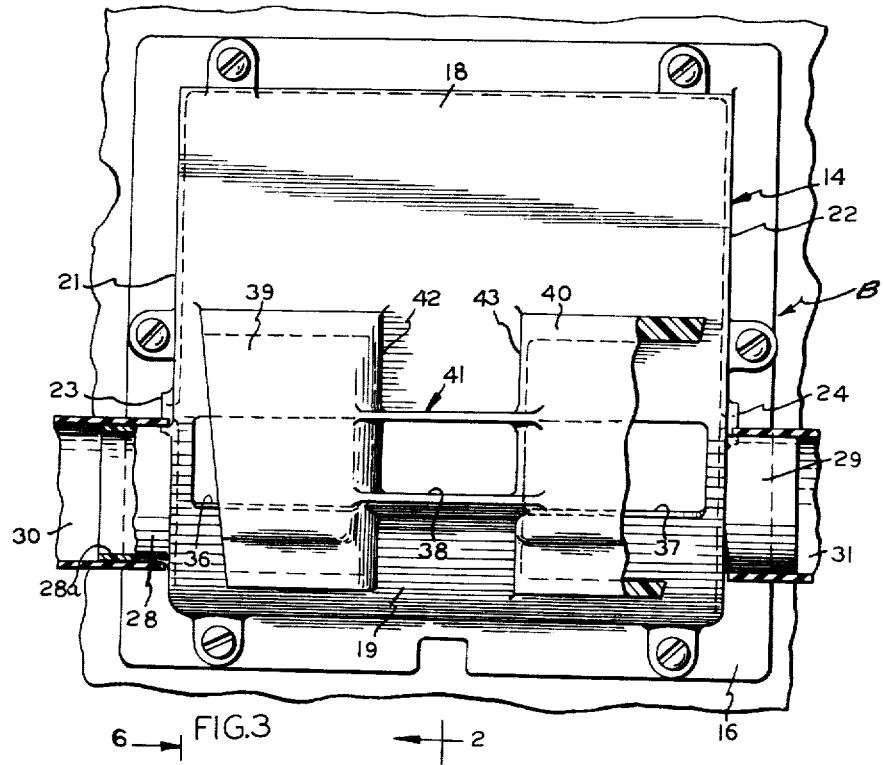
FIG. 3 is a front view of a portion of the system with certain parts shown in section and with the damper valve removed.

Referring to FIG. 1 I have shown an automotive vehicle A having a partition wall B (commonly identified as a dash panel) which separates the engine compartment C from the passenger compartment D.

I have shown an air-conditioning system in which atmospheric air may be introduced through a heat radiating core for warming the air before it is eventually discharged into the passenger compartment. It will be understood that the system could be one in which such atmospheric air is passed through a refrigerating core for cooling such air before it is eventually discharged into the passenger compartment area.

The atmospheric air enters the cowl opening 10 and passes through air reception chamber 11, thence through the heat radiating core 12, thence through the opening 13 (see FIG. 2) of the dash panel and then into the interior of the air distribution housing which is identified generally by the numeral 14. In an air-conditioning system of the type shown the outside air may be forced through the system into the passenger compartment by means of a power driven blower (not shown). Forward movement of the vehicle can also be utilized for forcing the air through the system. After the air enters the interior of housing 14, it is then selectively delivered to one or more loctations within the passenger compartment as desired.

Figure 4:
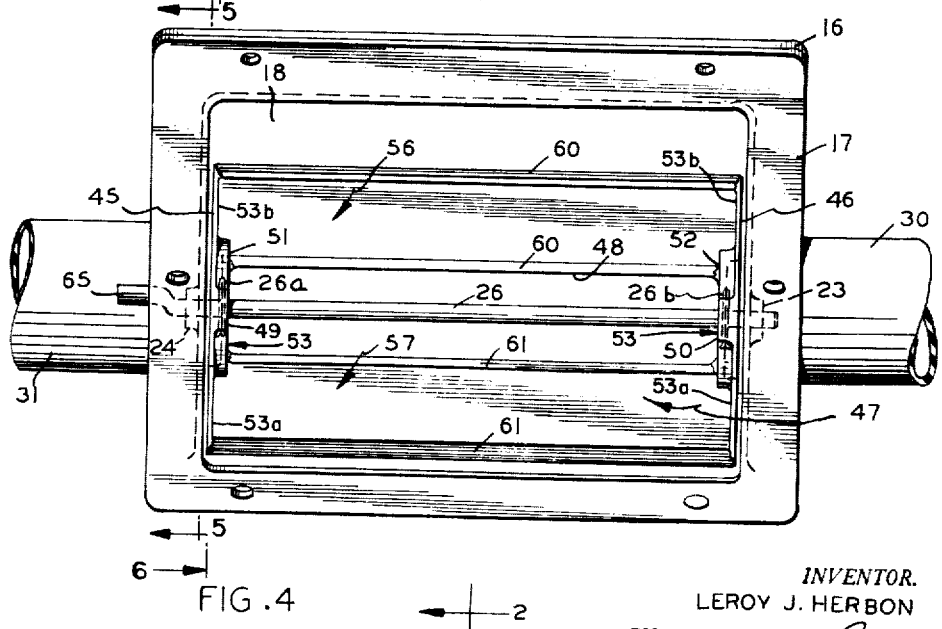
FIG. 4 is an interior view of the air distribution housing with the damper valve mounted therein, the housing discharge openings being omitted for purposes of clarity.

Referring to FIGS. 2, 3 and 4 the air distribution housing may be in the form of a singular casting, formed from synthetic resin material. It will be understood that other materials, metallic or non-metallic could be employed. The housing is provided with a generally rectangular mounting flange 16 securing the housing to the dash panel B in registry with the opening 13 therein. A suitable rectangular gasket 17 may be interposed between the housing flange and the perimeter area of the dash panel opening.

The housing has a generally flat upper front wall 18 which merges with the arcuate lower wall portion 19, the radius of the arc of such lower wall portion being generated from the axis 20. The arcuate wall portion 19 defines, in cross section, a cylindric sector of less than 180°. The end walls 21 and 22 of the housing have aligned bosses 23 and 24 with internal bores for receiving the ends of the damper valve shaft 26. The damper valve shaft, of course, provides the axis 20 about which the damper valve swings. The housing end walls likewise are provided respectively with outwardly projecting hollow air discharge stubs 28 and 29 onto which the flexible conduits 30 and 31 are mounted. The conduits extend upwardly to suitable air discharge openings 32 (see FIG. 1) which direct the air onto the windshield 33 for defrosting or defogging purposes. For purposes of clarity I have shown only one of such conduits 31 in FIG. 1.

The front wall of the housing has air discharge openings 36, 37 and 38 for directing air from the interior of the housing into the passenger compartment area of the vehicle, such openings being situated in the arcuate portion of the front housing wall. Formed integrally with the front housing wall are hollow air deflection cups 39 and 40 which direct the discharged air sideways toward opposite sides of the passenger compartment area. Also formed integrally with the front wall of the housing is the air discharge nozzle 41 which directs the discharged air lengthwise of the vehicle, such nozzle being sandwiched between the opposing end walls 42 and 43 of the cup members 39 and 40.

The damper valve may in the form of a singular casting, formed of material such as synthetic resin and comprising the end plates 45 and 46 and a shoe portion, identified generally by the numeral 47, interconnecting the end plates. The shoe portion is provided with an elongated opening 48 terminating at 49 and 50 adjacent the innermost surfaces 51 and 52 of the end plates. The central area 53 of each end plate projects inwardly (primarily for strengthening purposes) with reference to the side regions 53a and 53b thereof. The undersurface 54 of the shoe is arcuate throughout the length of such shoe, the radius of such arc being generated from the axis 20. The shoe portion of the valve, in cross section, defines a cylindric sector of less than 180°. The opening 48 affords separate shoe portions which may be identified as the leading shoe portion 56 and the trailing shoe portion 57, each of such shoe portions being of sufficient width and length to fully close off the housing discharge openings 36, 37, and 38 simultaneously when brought into appropriate position overlying such openings. It will be noted that each of the end plates are of sufficient width and length to fully close off discharge openings 28a and 29a when brought into appropriate position, as shown in FIG. 2, and such plates, in outline, are generally of sector form, less than 180° in extent. Referring to FIG. 6 is will be noted that the outer faces 45a of the end plates are flat and uninterrupted, such faces being exposed toward the respective flat inner faces of the housing end walls 21 and 22. The clearance between the outer faces of the end plates and the inner faces of the housing end walls 21 and 22 is adequate to permit free swinging movement of the damper valve within the housing 14 without incurring a binding condition or undesirable noise which would otherwise result from two surfaces rubbing against each other. Each shoe portion is covered at its underside with a coveing 60 and 61 respectively, such covering being of felt or some suitable material which would reduce noise and friction during the swinging of the damper valve.

The damper valve is secured to its actuating shaft 26 as by means of pins 26a and 26b. The damper valve shaft 26 has a crank portion 65 formed at one end for effecting the swinging of the damper valve. Means for rotating such shaft is illustrated in FIG. 2 as being a Bowden wire 66 which is secured at one end to the crank arm 65 and which is secured at its other end to the shank portion 67 of a suitable control knob 68. The damper valve may be more positively selectively positioned within housing 14 as by means of detents 69, 70 and 71 in shank 67 which co-act with a spring pressed ball 72. The spring pressed ball may be mounted in a suitable stationary portion 73 of the vehicle if desired. The Bowden wire may be provided with a suitable sheath 74 having one end received in a clip 75 secured to the outer face of the housing end wall 21 and having its other end (not shown) anchored on some stationary portion of the vehicle.

Operation

Assuming that the weather conditions are such that it is not desired to have outside air brought into the passenger compartment, then the damper valve is swung to the position as shown in solid lines in FIG. 2, the ball 70 being received in detent 71. In this position of the damper valve the leading shoe 56 completely closes off discharge openings 36, 37 and 38 while at the same time, the end plates 45 and 46 close off the respective discharge openings 28a and 29a.

Assuming that it is desired to have a quantity of air directed through the conduits 30 and 31 to the windshield while also having a quantity of air directed into the passenger compartment through openings 36, 37 and 38, then the control knob is pulled outwardly until ball 72 rests in detent 70. In this position the opening 48 is in full registry with discharge openings 36, 37 and 38 while the trailing edges 80 of the end plates reach a position as indicated in dotted lines in FIG. 2. Thus a portion of the discharge openings 28a and 29a are exposed thereby permitting a limited quantity of air to be directed up through the conduits 30 and 31 while a larger quantity of air is directed through discharge openings 36, 37 and 38. In the third position of the damper valve, with ball 72 in detent 69, the trailing shoe 57 fully closes off discharge openings 36, 37 and 38 while the discharge openings 28a and 29a are nearly completely exposed for permitting all of the air to be directed through conduits 30 and 31. The third position of the damper valve is likewise indicated in dotted lines in FIG. 2.

I claim:

1. Air distributing apparatus for a vehicle having a passenger compartment and an engine compartment separated by a partition wall, said apparatus comprising: means for admitting air from outside of the vehicle and directing same to the partition wall; an air reception housing mounted on the partition wall in the passenger compartment, said partition wall having an opening therein communicating with the interior of the housing; said housing having a front wall with a portion formed arcuately to define, in cross section, a cylindric sector of less than 180°; spaced end walls connected to the front wall at opposite ends thereof; said front wall having a discharge opening in its arcuate portion and the end walls having discharge openings; a damper valve carried by and between the end walls for swinging movement within the housing; said valve including an arcuate leading shoe and an arcuate trailing shoe collectively defining, in cross section, a cylindric sector of less than 180° and having an elongated slot formed therebetween; said valve also including spaced end plates connected at opposite ends of the leading and trailing shoes and maintaining said shoes in fixed spaced relation to each other; said end plates lying in a position substantially midway between the leading and trailing shoes and projecting laterally therefrom and said end plates having substantially flat outer faces exposed toward and lying in close proximity to the respective inner faces of the housing end walls, whereby swinging movement of said damper valve causes the leading shoe to close the front wall discharge opening while the valve end plates simultaneously close the respective housing end wall discharge openings and further swinging movement of said valve in the same direction causes said shoe slot to communicate directly with said housing front wall discharge opening while the valve end plates simultaneously partially close the housing end wall discharge openings, and further swinging movement of said valve in the same direction causes said trailing shoe to close said housing front wall discharge opening while the valve end plates simultaneously partially close said housing end wall discharge openings.

2. Air distributing apparatus for a vehicle having a passenger compartment and an engine compartment separated by a partition wall, said apparatus comprising: means for admitting air from outside of the vehicle and directing same to the partition wall; an air reception housing mounted on the partition wall in the passenger compartment, said partition wall having an opening therein communicating with the interior of the housing; said housing having a front wall with a portion formed arcuately to define, in cross section, a cylindric sector of less than 180°; spaced end walls connected to the front wall at opposite ends thereof; said front wall having a discharge opening in its arcuate portion and the end walls having discharge openings; a damper valve carried by and between the end walls for swinging movement within the housing; said valve including an arcuate leading shoe and an arcuate trailing shoe collectively defining, in cross section, a cylindric sector of less than 180° and having an elongated slot formed therebetween; said valve also including spaced end plates connected at opposite ends of the leading and trailing shoes and maintaining said shoes in fixed spaced relation to each other; said end plates lying in a position substantially midway between the leading and trailing shoes and projecting laterally therefrom and said end plates having substantially flat outer faces exposed toward and lying in close proximity to the respective inner faces of the housing end walls, whereby swinging movement of said damper valve causes the leading shoe to close the front wall discharge opening while the valve end plates simultaneously close the respective housing end wall discharge openings and further swinging movement of said valve in the same direction causes said shoe slot to communicate directly with said housing front wall discharge opening while the valve end plates simultaneously partially close the housing end wall discharge openings, and further swinging movement of said valve in the same direction causes said trailing shoe to close said housing front wall discharge opening while the valve end plates simultaneously partially close said housing end wall discharge openings; spaced air diverting housings covering an area adjacent the ends of said front opening whereby when said longitudinally extending slot is in communication with said front opening, air is directed through an opening between said housings and through said housing end openings.

3. Air distributing apparatus for a vehicle having a passenger compartment and an engine compartment separated by a partition wall, said apparatus comprising: means for admitting air from outside of the vehicle and directing same to the partition wall; an air reception housing mounted on the partition wall in the passenger compartment, said partition wall having an opening therein communicating with the interior of the housing; said housing having a front wall with a portion formed arcuately to define, in cross section, a cylindric sector of less than 180°; spaced end walls connected to the front wall at opposite ends thereof; said front wall having a discharge opening in its arcuate portion and the end walls having discharge openings; a damper valve carried by and between the end walls for swinging movement within the housing; said valve including an arcuate leading shoe and an arcuate trailing shoe collectively defining, in cross section, a cylindric sector of less than 180° and having an elongated slot formed therebetween; said valve also including spaced end plates connected at opposite ends of the leading and trailing shoes and maintaining said shoes in fixed spaced relation to each other; said end plates each having surface areas greater than the areas bounded by the circumference of each of the housing end wall discharge openings; said end plates lying in a position substantially midway between the leading and trailing shoes and projecting laterally therefrom and said end plates having substantially flat outer faces exposed toward and lying in close proximity to respective inner faces of the housing end walls, the discharge openings in the end walls being longitudinally aligned and the center line of such alignment being offset with reference to the center line of the front wall discharge opening, whereby swinging movement of said damper valve causes the leading shoe to close the front wall discharge opening while the valve end plates simultaneously close the respective housing end wall discharge openings and further swinging movement of said valve in the same direction causes said shoe slot to communicate directly with said housing front wall discharge opening while the valve end plates simultaneously partially close the housing end wall discharge openings, and further swinging movement of said valve in the same direction causes said trailing shoe to close said housing front wall discharge opening while the valve end plates simultaneously partially close said housing end wall discharge openings.

4. Air distributing apparatus as set forth in claim 3 wherein means are provided for limiting the total swinging movement of the valve throughout an arc of less than 180°.

References Cited in the file of this patent

UNITED STATES PATENTS

| 1,068,516 | Matthews | July 29, 1913 |
| 2,738,718 | Reynolds | Mar. 20, 1956 |

FOREIGN PATENTS

| 728,016 | Great Britain | Apr. 13, 1955 |
| 1,213,964 | France | Apr. 5, 1960 |

UNITED STATES PATENT OFFICE
CERTIFICATE OF CORRECTION

Patent No. 3,090,291

May 21, 1963

Leroy J. Herbon

It is hereby certified that error appears in the above numbered patent requiring correction and that the said Letters Patent should read as corrected below.

Column 1, line 38, after "on" insert -- the --; line 50, after "introduced" insert -- through the engine compartment area and passed --; column 2, line 62, for "is" read -- it --.

Signed and sealed this 31st day of December 1963.

(SEAL)
Attest:

ERNEST W. SWIDER

Attesting Officer

EDWIN L. REYNOLDS

Acting Commissioner of Patents